United States Patent
Hosomi et al.

(10) Patent No.: US 12,394,208 B2
(45) Date of Patent: Aug. 19, 2025

(54) MOBILE OBJECT CONTROL DEVICE, MOBILE OBJECT CONTROL METHOD, AND STORAGE MEDIUM

(71) Applicants: HONDA MOTOR CO., LTD., Tokyo (JP); OSAKA UNIVERSITY, Suita (JP)

(72) Inventors: Naoki Hosomi, Wako (JP); Teruhisa Misu, San Jose, CA (US); Kazunori Komatani, Suita (JP); Ryu Takeda, Suita (JP); Ryusei Taniguchi, Suita (JP)

(73) Assignees: HONDA MOTOR CO., LTD., Tokyo (JP); OSAKA UNIVERSITY, Osaka (JP)

( * ) Notice: Subject to any disclaimer, the term of this patent is extended or adjusted under 35 U.S.C. 154(b) by 347 days.

(21) Appl. No.: 18/079,097

(22) Filed: Dec. 12, 2022

(65) Prior Publication Data

US 2024/0193955 A1  Jun. 13, 2024

(51) Int. Cl.
  *G05D 1/00* (2024.01)
  *G05D 1/2285* (2024.01)
  (Continued)

(52) U.S. Cl.
  CPC ............ *G06V 20/56* (2022.01); *G06V 10/764* (2022.01); *G10L 15/22* (2013.01); *G10L 2015/223* (2013.01)

(58) Field of Classification Search
  USPC ............ 382/100–159; 704/1–275; 706/1–62, 706/900–903, 905, 917; 901/1, 46
  See application file for complete search history.

(56) References Cited

U.S. PATENT DOCUMENTS 11,461,592 B2 * 10/2022 Javidi .................... G06V 10/25
11,874,668 B2 *  1/2024 Song ................... G05D 1/0274
(Continued)

FOREIGN PATENT DOCUMENTS

| JP | 2022-078760 | 5/2022 |
| JP | 2022-155106 | 10/2022 |
| WO | 2018/096902 | 5/2018 |

OTHER PUBLICATIONS

International Search Report for International Patent Application No. PCT/JP2023/044443 dated Feb. 27, 2024.
(Continued)

*Primary Examiner* — Marcellus J Augustin
(74) *Attorney, Agent, or Firm* — Amin, Turocy & Watson, LLP

(57) ABSTRACT

A mobile object control device acquires a captured image obtained by capturing an image of surroundings of the mobile object by a camera mounted on a mobile object and an input directive sentence input by a user of the mobile object, inputs, when an image and a directive sentence are input, the captured image and the input directive sentence into a learned model learned to output one or more objects corresponding to the directive sentence in the image together with corresponding degrees of certainty to detect the one or more objects and the corresponding degrees of certainty, sequentially selects the one or more objects based on at least the degree of certainty and makes an inquiry to a user of the mobile object, and causes the mobile object to travel to an indicated position in the input directive sentence, which is specified based on a result of the inquiry.

11 Claims, 6 Drawing Sheets

(51) Int. Cl.
  *G06V 10/764* (2022.01)
  *G06V 20/56* (2022.01)
  *G10L 15/22* (2006.01)

(56) References Cited

U.S. PATENT DOCUMENTS

2018/0332219 A1* 11/2018 Corcoran ............ H04N 23/635
2020/0016742 A1    1/2020 Ishikawa et al.
2021/0312199 A1* 10/2021 Hashimoto .......... G05D 1/0246
2022/0155780 A1    5/2022 Mukai et al.
2022/0315062 A1* 10/2022 Kondapally ........... G06V 20/56
2024/0203131 A1*  6/2024 Rahimi ................ G06V 10/776

OTHER PUBLICATIONS

Gervits, et al. Decision-Theoretic Question Generation for Situated Reference Resolution: An Empirical Study and Computational Model, arXiv:2110.06288v1, 2021.

* cited by examiner

MOBILE OBJECT CONTROL DEVICE, MOBILE OBJECT CONTROL METHOD, AND STORAGE MEDIUM

BACKGROUND

Field of the Invention

The present invention relates to a mobile object control device, a mobile object control method, and a storage medium.

Description of Related Art

Conventionally, a technology for detecting an object in an input image on the basis of a directive sentence given by a human being and the input image is known. For example, in Felix Gervits, "Decision-Theoretic Question Generation for Situated Reference Resolution: An Empirical Study and Computational Model," an efficient dialogue method for inferring an object indicated by a user in the input image according to a dialogue is proposed.

SUMMARY

However, in general, there may be recognition errors in the results of detecting an object, and misunderstandings may occur between a user and a system depending on a degree of certainty of a detected object used in a dialogue. In this case, the number of utterance turns of a dialogue required to finally specify an object indicated by a user may increase, and the convenience for the user of a mobile object may decrease in some cases.

The present invention has been made in consideration of such circumstances, and an object thereof is to provide a mobile object control device, a mobile object control method, and a storage medium that can reduce the number of utterance turns of a dialogue required to finally specify an object indicated by a user of a mobile object, and improve convenience for the user.

The mobile object control device, the mobile object control method, and the storage medium according to the present invention have adopted the following configuration.

(1): A mobile object control device according to one aspect of the present invention includes a storage medium configured to store an instruction readable by a computer, and a processor connected to the storage medium, in which the processor executes the instruction readable by the computer, thereby acquiring a captured image obtained by capturing an image of surroundings of the mobile object by a camera mounted on a mobile object and an input directive sentence input by a user of the mobile object, inputting, when an image and a directive sentence are input, the captured image and the input directive sentence to a learned model learned to output one or more objects corresponding to the directive sentence in the image together with corresponding degrees of certainty to detect the one or more objects and the corresponding degrees of certainty, sequentially selecting the one or more objects on the basis of at least the degree of certainty and making an inquiry to a user of the mobile object, and causing the mobile object to travel to an indicated position in the input directive sentence, which is specified on the basis of a result of the inquiry.

(2): In the aspect of (1) described above, the processor selects, among the acquired one or more objects, objects in descending order of score values considering at least the degree of certainty, and makes an inquiry to a user of the mobile object.

(3): In the aspect of (2) described above, the processor selects objects in descending order of score values further considering a horizontal position of the acquired one or more objects in the captured image, and makes an inquiry to a user of the mobile object.

(4): In the aspect of (2) described above, the processor classifies the acquired one or more objects into one or more classes, selects objects in descending order of score values further considering a classification ratio of the one or more classes, and makes an inquiry to a user of the mobile object.

(5): In the aspect of (2) described above, the processor selects objects in descending order of score values further considering a moving tendency of the acquired one or more objects, and makes an inquiry to a user of the mobile object.

(6): A mobile object control method according to another aspect of the present invention includes, by a computer, acquiring a captured image obtained by capturing an image of surroundings of the mobile object by a camera mounted on a mobile object and an input directive sentence input by a user of the mobile object, inputting, when an image and a directive sentence are input, the captured image and the input directive sentence into a learned model learned to output one or more objects corresponding to the directive sentence in the image together with corresponding degrees of certainty to detect the one or more objects and the corresponding degrees of certainty, sequentially selecting the one or more objects on the basis of at least the degree of certainty and making an inquiry to a user of the mobile object, and causing the mobile object to travel to an indicated position in the input directive sentence, which is specified on the basis of a result of the inquiry.

(7): A computer-readable non-transitory storage medium according to still another aspect of the present invention stores a program causing a computer to execute acquiring a captured image obtained by capturing an image of surroundings of the mobile object by a camera mounted on a mobile object and an input directive sentence input by a user of the mobile object, inputting, when an image and a directive sentence are input, the captured image and the input directive sentence into a learned model learned to output one or more objects corresponding to the directive sentence in the image together with corresponding degrees of certainty to detect the one or more objects and the corresponding degrees of certainty, sequentially selecting the one or more objects on the basis of at least the degree of certainty and making an inquiry to a user of the mobile object, and causing the mobile object to travel to an indicated position in the input directive sentence, which is specified on the basis of a result of the inquiry.

According to the aspects of (1) to (7), it is possible to reduce the number of utterance turns of a dialogue required to finally specify an object indicated by a user of the mobile object and improve convenience for the user.

DESCRIPTION OF EMBODIMENTS

Hereinafter, an embodiment of a mobile object control device, a mobile object control method, and a storage medium of the present invention will be described with reference to the drawings. A mobile object control device is mounted in a mobile object. A mobile object moves both on a roadway and in a predetermined area other than a roadway. The mobile object is sometimes referred to as a micro-mobility device. An electric scooter is a form of the micro-mobility device. The predetermined area is, for example, a sidewalk. In addition, the predetermined area may be a part or all of a roadside strip, a bike lane, an open space, and the like, or may include all of a sidewalk, a roadside strip, a bike lane, an open space, and the like. In the following description, it is assumed that the predetermined area is a sidewalk. In the following description, a part described as "sidewalk" can be appropriately read as a "predetermined area."

[Overall Configuration]

Figure 1:
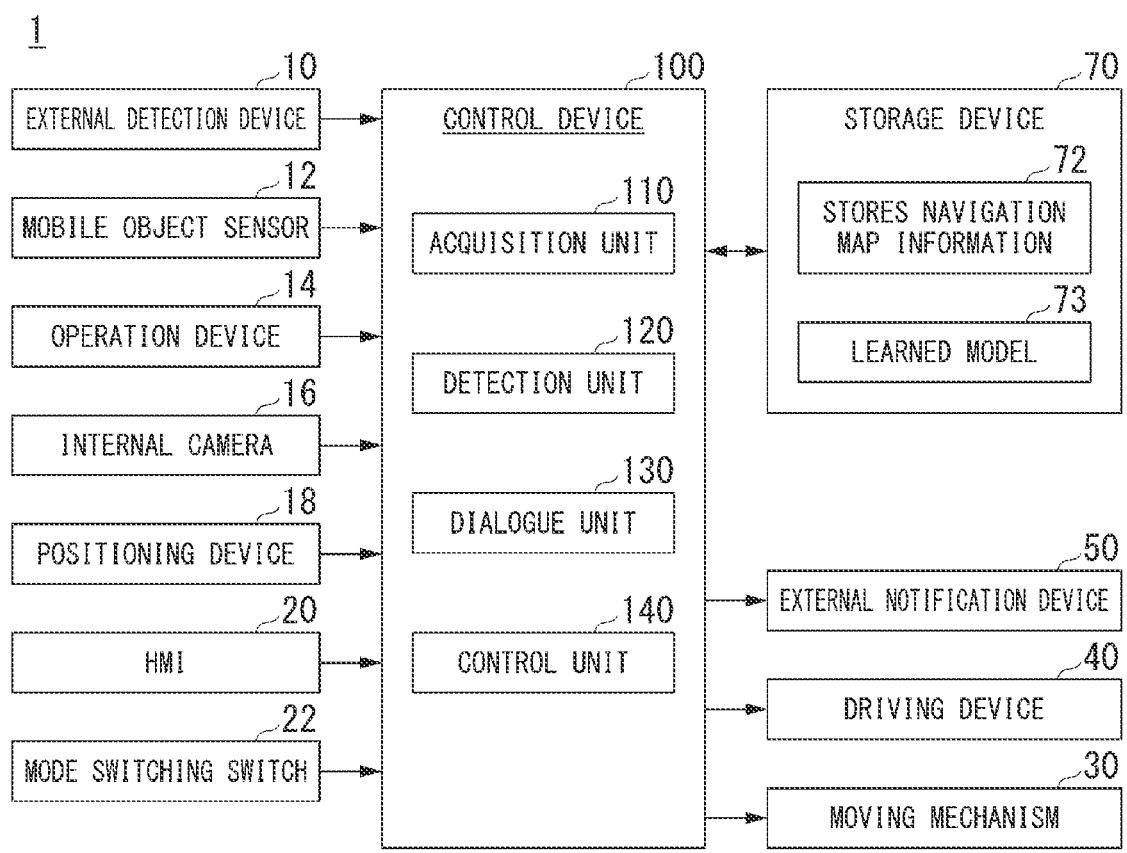
FIG. 1 is a diagram which shows an example of a configuration of a mobile object and a control device according to an embodiment.

FIG. 1 is a diagram which shows an example of a configuration of a mobile object 1 and a control device 100 according to an embodiment. The mobile object 1 includes, for example, an external detection device 10, a mobile object sensor 12, an operation device 14, an internal camera 16, a positioning device 18, an HMI 20, a mode switching switch 22, a moving mechanism 30, a driving device 40, an external notification device 50, a storage device 70, and a control device 100 mounted thereon. Note that some of these constituents that are not essential for realizing functions of the present invention may be omitted. Examples of a mobile object are not limited to vehicles, but may include small mobility devices that run parallel to walking users to carry luggage or lead people, and may also include other mobile objects capable of autonomous movement (for example, walking robots, and the like).

The external detection device 10 is various devices whose detection range is a traveling direction of the mobile object 1. The external detection device 10 includes an external camera, a radar device, a light detection and ranging (LI-DAR), a sensor fusion device, and the like. The external detection device 10 outputs information indicating results of detection (an image, an object position, and the like) to the control device 100. In particular, in the present embodiment, the external detection device 10 outputs a captured image obtained by capturing an image of surroundings of the mobile object 1 by the external camera to the control device 100.

The mobile object sensor 12 includes, for example, a speed sensor, an acceleration sensor, a yaw rate (angular speed) sensor, an orientation sensor, and an operation amount detection sensor attached to the operation device 14. The operation device 14 includes, for example, an operation device for instructing acceleration or deceleration (such as an accelerator pedal and a brake pedal) and an operation device for instructing steering (such as a steering wheel). In this case, the mobile object sensor 12 may include an accelerator opening sensor, a brake depression amount sensor, a steering torque sensor, and the like. The mobile object 1 may include an operation device of a form other than those described above as the operation device 14 (for example, a non-circular rotating operation device, a joystick, a button, or the like).

The internal camera 16 captures at least an image of the head of an occupant of the mobile object 1 from the front. The internal camera 16 is a digital camera using an imaging device such as a charge coupled device (CCD) or complementary metal oxide semiconductor (CMOS). The internal camera 16 outputs the captured image to the control device 100.

The positioning device 18 is a device for measuring the position of the mobile object 1. The positioning device 18 is, for example, a global navigation satellite system (GNSS) receiver, identifies the position of the mobile object 1 on the basis of a signal received from GNSS satellites, and outputs it as positional information. Note that positional information of the mobile object 1 may be estimated based on a position of a Wi-Fi base station to which a communication device (to be described below) is connected.

The HMI 20 includes a display device, a speaker, a touch panel, a key, and the like. The occupant of the mobile object 1 sets, for example, a destination of the mobile object 1 via the HMI 20, and the control unit 130, which will be described below, causes the mobile object 1 to travel to the set destination. In particular, in the present embodiment, the HMI 20 includes a voice input device such as a microphone, and the occupant of the mobile object 1 is assumed to input a directive sentence that indicates a stop position of the mobile object 1 to the voice input device by uttering it. The HMI 20 performs voice analysis on the input directive sentence, converts it into text, and outputs it to the control device 100. Alternatively, the HMI 20 may receive, for example, a directive sentence input as text by the occupant via a touch panel, and output the received directive sentence to the control device 100. Furthermore, alternatively, the occupant of the mobile object 1 may also be connected to the control device 100 via a terminal device such as a smartphone or a tablet terminal held by himself or herself. In this case, the occupant of the mobile object 1 utters the directive sentence indicating the stop position of the mobile object 1 to a voice input unit of the terminal device, and the terminal device transmits the input utterance information to the control device 100. In addition, for example, the occupant of the mobile object 1 may input the directive sentence indicating the stop position of the mobile object 1 to the touch panel of the terminal device as text, and the terminal device may transmit the input directive sentence to the control device 100.

The mode switching switch 22 is a switch operated by the occupant. The mode switching switch 22 may be a mechanical switch or a graphical user interface (GUI) switch set on the touch panel of the HMI 20. The mode switching switch 22 receives, for example, an operation of switching an operation mode to any one of a mode A: an assistance mode in which one of a steering operation and acceleration or deceleration control is performed by the occupant and the other is automatically performed, and which has a mode A-1 in which a steering operation is performed by the occupant and acceleration or deceleration control is automatically performed and a mode A-2 in which acceleration or deceleration operation is performed by the occupant and steering control is automatically performed, a mode B: a manual operation mode in which a steering operation and an acceleration or deceleration operation are performed by the occupant, and a mode C: an automated operation mode in which operation control and acceleration or deceleration control are automatically performed.

The moving mechanism 30 is a mechanism for causing the mobile object 1 to move on a road. The moving mechanism 30 is, for example, a wheel group including steering wheels and driving wheels. In addition, the moving mechanism 30 may be legs for multi-pedal walking.

The driving device 40 outputs force to the moving mechanism 30 to cause the mobile object 1 to move. For example, the driving device 40 includes a motor that drives the driving wheels, a battery that stores power to be supplied to the motor, a steering device that adjusts a steering angle of the steering wheels, and the like. The driving device 40 may include an internal combustion engine, a fuel cell, or the like as a driving force output device or a power generation device. In addition, the driving device 40 may further include a brake device using frictional force or air resistance.

The external notification device 50 is, for example, a lamp, a display device, a speaker, or the like which is provided on an outer plate of the mobile object 1 and is for notifying information to the outside of the mobile object 1. The external notification device 50 operates differently depending on whether the mobile object 1 is moving on a sidewalk or on a roadway. For example, the external notification device 50 is controlled such that it lights the lamp when the mobile object 1 is moving on the sidewalk and does not light the lamp when the mobile object 1 is moving on the roadway. It is preferable that a color of light emitted from this lamp be a color stipulated by law. The external notification device 50 may be controlled such that it causes the lamp to emit green light when the mobile object 1 is moving on the sidewalk, and causes the lamp to emit blue light when the mobile object 1 is moving on the roadway. When the external notification device 50 is a display device, the external notification device 50 displays "the mobile object 1 is traveling on the sidewalk" using text or graphics when the mobile object 1 is traveling on the sidewalk.

Figure 2:
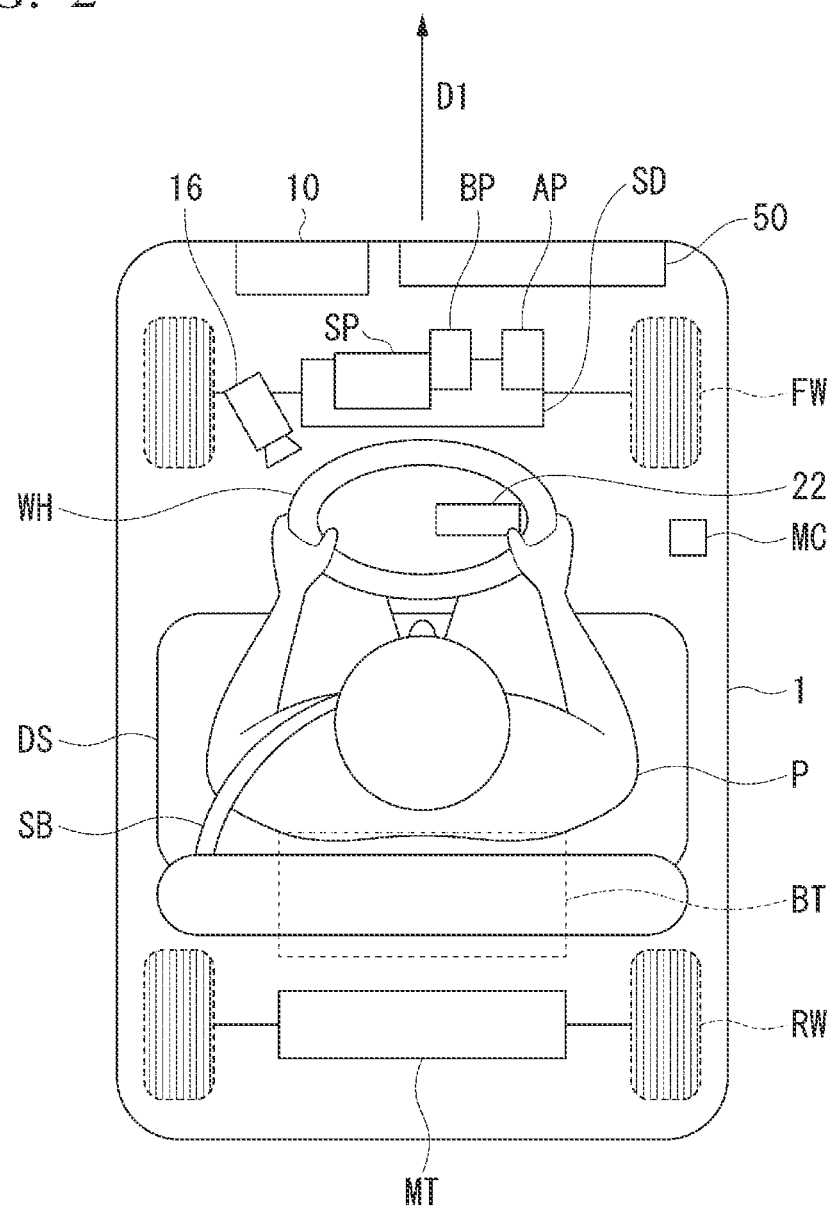
FIG. 2 is a perspective view of a mobile object from above.

FIG. 2 is a perspective view of the mobile object 1 as viewed from above. In FIG. 2, FW is a steering wheel, RW is a driving wheel, SD is a steering device, MT is a motor, and BT is a battery. The steering device SD, the motor MT, and the battery BT are included in the driving device 40. In addition, AP is an accelerator pedal, BP is a brake pedal, WH is a steering wheel, SP is a speaker, and MC is a microphone. The shown mobile object 1 is a single riding mobile object, and an occupant P is seated on a driver's seat DS and wearing a seat belt SB. An arrow D1 is the traveling direction (speed vector) of the mobile object 1. The external detection device 10 is provided near a front end of the mobile object 1, the internal camera 16 is provided at a position where an image of the head of the occupant P can be captured from the front of the occupant P, and the mode switching switch 22 is provided on each boss part of the steering wheel WH. In addition, the external notification device 50 is provided near the front end of the mobile object 1 as a display device.

Returning to FIG. 1, the storage device 70 is, for example, a non-transitory storage device such as a hard disk drive (HDD), a flash memory, or a random access memory (RAM). The storage device 70 stores navigation map information 72, a learned model 73, and the like. Although the storage device 70 is shown outside a frame of the control device 100 in FIG. 1, the storage device 70 may be included in the control device 100. In addition, the storage device 70 may be provided on a server (not shown).

The navigation map information 72 is map information stored in advance in the storage device 70 and includes, for example, road center information including roadways and sidewalks, road boundary information, and the like. The navigation map information 72 further includes information (name, address, area, and the like) on facilities and buildings in contact with a boundary of a road. The learned model 73 will be described below.

[Control Device]

The control device 100 includes, for example, an acquisition unit 110, a detection unit 120, a dialogue unit 130, and a control unit 140. The acquisition unit 110, the detection unit 120, the dialogue unit 130, and the control unit 140 are realized by, for example, a hardware processor such as a central processing unit (CPU) executing a program (software) 74. Some or all of these components may be realized by hardware (a circuit unit; including circuitry) such as large scale integration (LSI), an application specific integrated circuit (ASIC), a field-programmable gate array (FPGA), and a graphics processing unit (GPU), or by software and hardware in cooperation. The program may be stored in a storage device 70 in advance, or may be stored in a detachable storage medium (non-transitory storage medium) such as a DVD or CD-ROM and be installed on a storage device 70 by the storage medium being attached to a drive device. A combination of the acquisition unit 110, the detection unit 120, the dialogue unit 130, and the control unit 140 is an example of the "mobile object control device."

The acquisition unit 110 acquires a captured image obtained by capturing an image of the surroundings of the mobile object 1 with the external camera, which is the external detection device 10. Furthermore, the acquisition unit 110 acquires a directive sentence indicating the stop position of the mobile object 1, which is input by the occupant of the mobile object 1 via the voice input device that is the HMI 20.

By inputting the captured image and the directive sentence acquired by the acquisition unit 110 into the learned model 73, the detection unit 120 detects one or more objects corresponding to the directive sentence in the captured image together with corresponding degrees of certainty. That is, the learned model 73 is an arbitrary machine learning model learned to output an object corresponding to a directive sentence in an image together with its degree of certainty when the image and the directive sentence are input. Here, a degree of certainty is an index value that represents a degree of likelihood that an object corresponds to a directive sentence (in other words, the object is present in the vicinity of a stop position indicated by an occupant according to the directive sentence).

Figure 3:
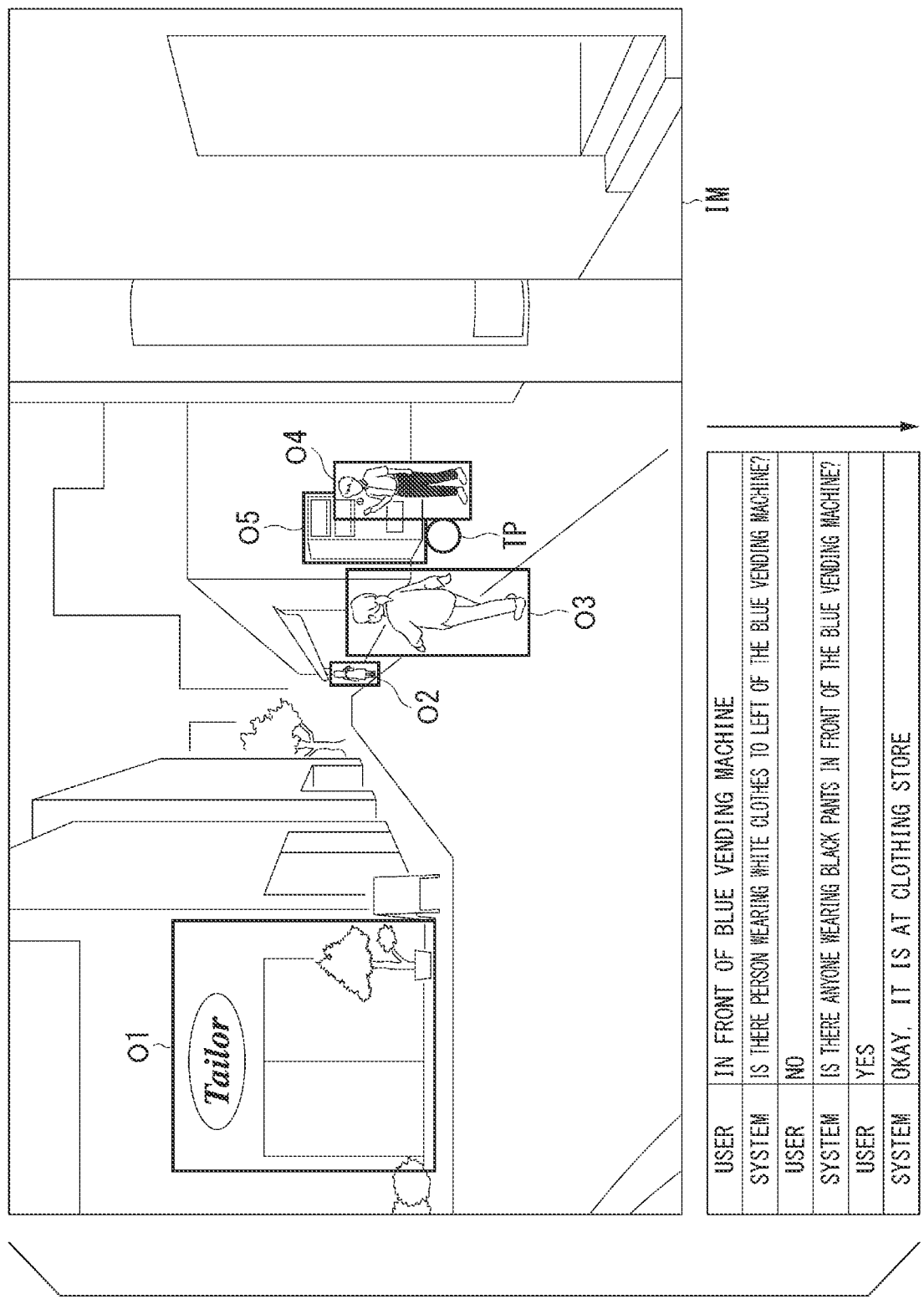
FIG. 3 is a diagram which shows an example of a dialogue with an occupant executed by a dialogue unit of prior art.

The dialogue unit 130 sequentially selects objects detected by the detection unit 120 and makes an inquiry to the occupant whether the selected objects correspond to the directive sentence. FIG. 3 is a diagram which shows an example of a dialogue with an occupant, executed by the dialogue unit 130 of a conventional technology. In a left part of FIG. 3, a symbol IM represents a captured image, and symbols O1 to O5 represent the objects detected by the detection unit 120. In a right part of FIG. 3, an example of a dialogue with an occupant, executed by the dialogue unit 130 when the occupant inputs "in front of a blue vending machine," as an example of a directive sentence is shown.

As shown in the right part of FIG. 3, when the occupant inputs the directive sentence, the dialogue unit 130 of the conventional technology first selects, for example, an object O2 (that is, a person wearing white clothes) closest to the mobile object 1, and inquires of the occupant, "Is there a person wearing white clothes on the left of the blue vending machine?" When the occupant inputs "no" in response to this inquiry, the dialogue unit 130 of the conventional technology selects an object O4 (that is, a person wearing black pants) that is the second closest to the mobile object 1 and inquires of the occupant, "Is there anyone wearing black pants in front of the blue vending machine?" When the occupant inputs "yes" in response to this inquiry, the control unit 140 specifies a destination point TP that is close to the object O5 and at which the mobile object 1 can be parked from the captured image, and causes the mobile object 1 to travel to the specified destination point TP.

Thus, in the conventional technology, misunderstandings occur between the occupant of the mobile object 1 and a system, and the number of utterance turns required to specify the final destination point TP may tend to increase. With this background, the dialogue unit 130 of the present embodiment selects objects in descending order of score value (reference value) considering at least the degree of certainty of an object output by the learned model 73, and makes an inquiry to the occupant, thereby reducing the number of utterance turns and improving convenience for the occupant.

The dialogue unit 130 first calculates a score value for preferentially selecting one of the objects detected by the detection unit 120 as an object to inquire of the occupant. More specifically, the dialogue unit 130 calculates a score value S for each of the objects detected by the detection unit 120 according to the following equation (1).

$$\text{score value } S = w_1 c + w_2 n + w_3 u + w_4 s \tag{1}$$

In Equation (1), c represents a degree of certainty output by the learned model 73, n represents a degree of area narrowing-down indicating a usefulness for narrowing down an area containing an object corresponding to a directive sentence from a captured image IM, u represents a uniqueness of the object, s represents a static nature of the object, and $w_1$ to $w_4$ represent positive weightings of these four parameters. That is, the dialogue unit 130 calculates a higher score value S as values of these four parameters increase, and an object for which a higher score value S is calculated is selected more preferentially, and presented to the occupant. Weights $w_1$ to $w_4$ may be tuned in any methods or heuristically set. In the following description, details of the degree of area narrowing-down n, the uniqueness u, and the static nature s will be described.

Figure 4:
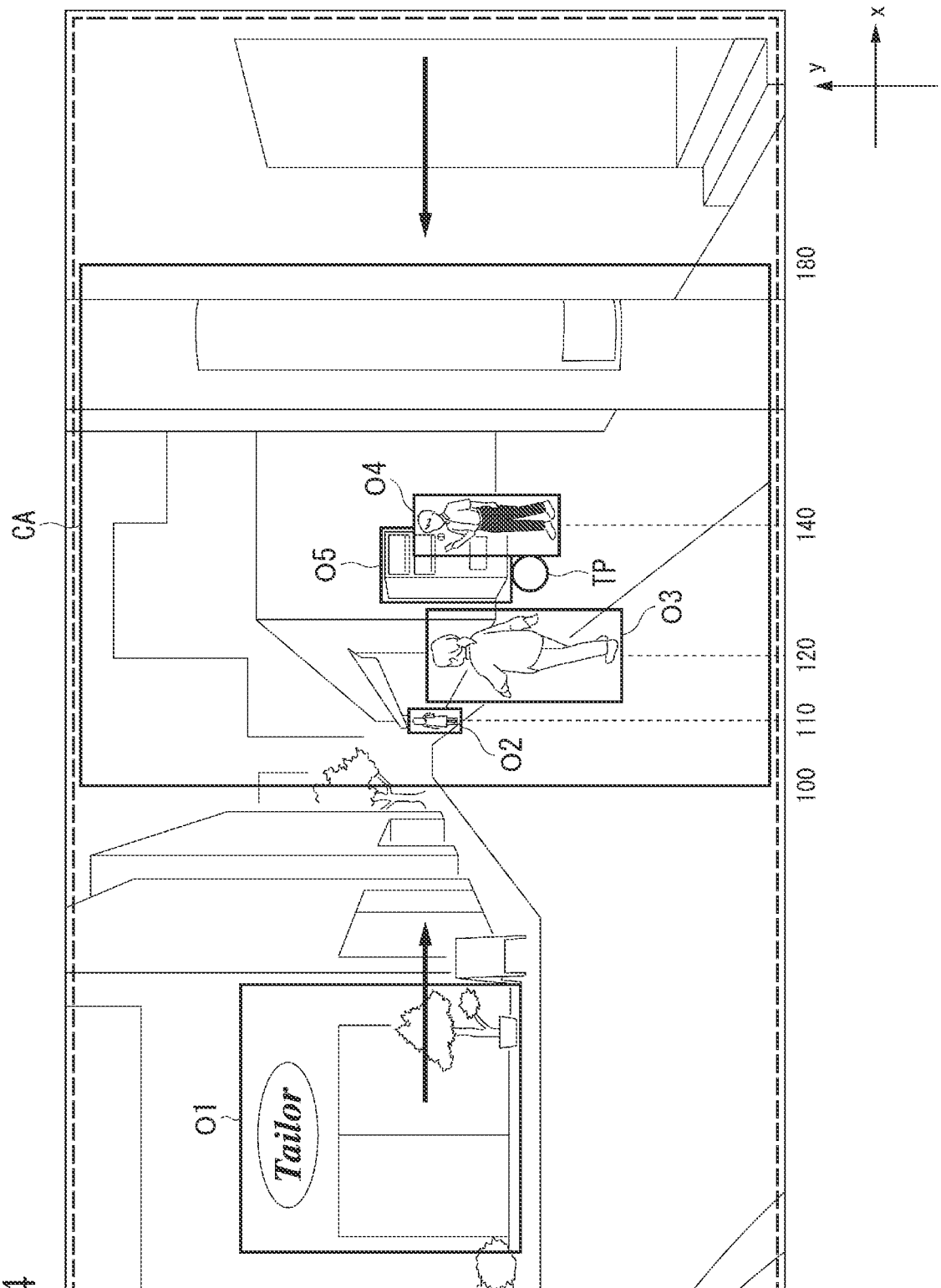
FIG. 4 is a diagram for describing a degree of area narrowing-down taken into account in calculation of a score value.

FIG. 4 is a diagram for describing the degree of area narrowing-down n that is considered in calculating a score value. In FIG. 4, a symbol CA represents a candidate area for narrowing down the area containing an object corresponding to a directive sentence from the captured image IM. First, the dialogue unit 130 sets a coordinate system for the entire captured image IM (in FIG. 4, a coordinate system in which a horizontal direction of mobile object 1 is an x axis and a vertical direction thereof is a y axis) at the time of starting a dialogue with the occupant, and assumes the entire captured image IM to be a candidate area CA. Next, the dialogue unit 130 specifies an x-coordinate L of a left end of the candidate area CA and an x-coordinate R of a right end of the candidate area CA, and specifies an x-coordinate ox for each object included in the candidate area CA. For example, in the case of the candidate area CA shown in FIG. 4, the dialogue unit 130 specifies L=100, the x-coordinate ox of an object O2=110, the x-coordinate ox of an object O3=120, the x-coordinate ox of an object O4=140, and R=180. Next, the dialogue unit 130 calculates the degree of area narrowing-down n for each object according to the following equation (2).

[Math 1]

$$n = (R - L) - \frac{(o_x - R)^2 + (o_x - L)^2}{R - L} \tag{2}$$

Equation (2) means an extent to which the candidate area CA can be reduced as a result of inquiring of the occupant whether an object is to the right or left of the target position. For example, in a situation shown in FIG. 4, when the occupant is inquired of whether the object O3 is to the right or left of the target position, if the occupant answers that it is to the right, the candidate area CA can be reduced in the x-axis direction by an amount corresponding to 120−100=20. On the other hand, if the occupant answers that it is to the left, the candidate area CA can be reduced in the x-axis direction by an amount corresponding to 180−120=60. That is, the dialogue unit 130 preferentially selects an object with a higher degree of area narrowing-down n, thereby reducing the number of utterance turns required to specify the final destination point TP. The method of calculating the degree of area narrowing-down n using Equation (2) described above is just an example, and more generally, can be any methods as long as it gives a larger value to an object with a larger area that can be narrowed down (area that can be reduced) in the captured image.

The dialogue unit 130 further classifies each detected object into classes, and calculates a classification rate of each class into which the object is classified (or a value having a positive correlation with the classification rate) as the uniqueness u of the object. This is because it is easier to specify a target position of the occupant using the object as the calculated uniqueness u increases. For example, in the situation shown in FIG. 4, the object O1 is classified into a store class, the objects O2 to O4 are classified into a pedestrian class, and the object O5 is classified into a vending machine class. In this case, for example, when the occupant inputs a directive sentence "the target position is on the right of a pedestrian," the dialogue unit 130 cannot specify which occupant is meant among the objects O2 to O4, but when a directive sentence "the target position is in front of a store" is input, the dialogue unit 130 can specify that the directive sentence means the object O1. In this manner, when the dialogue unit 130 makes an inquiry to the occupant, it preferentially presents an object with a higher uniqueness u to the occupant, thereby more easily specifying the target position intended by the occupant.

The dialogue unit 130 may define subclasses subordinate to a certain class when it classifies each detected object. For example, the dialogue unit 130 may define subclasses into which the pedestrian class is classified by gender and clothes, and may also calculate a classification ratio (or a value having a positive correlation with the classification ratio) of each subclass into which an object is classified as the uniqueness u of the object.

The dialogue unit 130 further calculates, for each detected object, the static nature s that is given a higher value if the object is a static object. For example, the dialogue unit 130 calculates the static nature s to be high when the class of an object indicates a fixedly installed object such as a store, a utility pole, or a vending machine, while it calculates the static nature s to be low when the class of an object is a dynamically movable object such as a person or a vehicle. This is because a divergence between the position at the time of making an inquiry by the dialogue unit 130 and the position at the time of answering by the occupant is smaller as the calculated static nature s increases, and this can reduce possibility of occurring misunderstandings in communication. The static nature s may be defined in advance in any methods by linking to the class of an object, or may be heuristically set and stored in advance as table information corresponding to each class. The static nature s is an example of a "moving tendency."

Alternatively, the dialogue unit 130 may use the external detection device 10 to estimate an amount of movement of each detected object at a predetermined time, and calculate the static nature s with a tendency to give a higher value as the amount of movement of an object is lower. In this case, the static nature s can be calculated as a continuous value and can be reflected in the score value S continuously.

Figure 5:
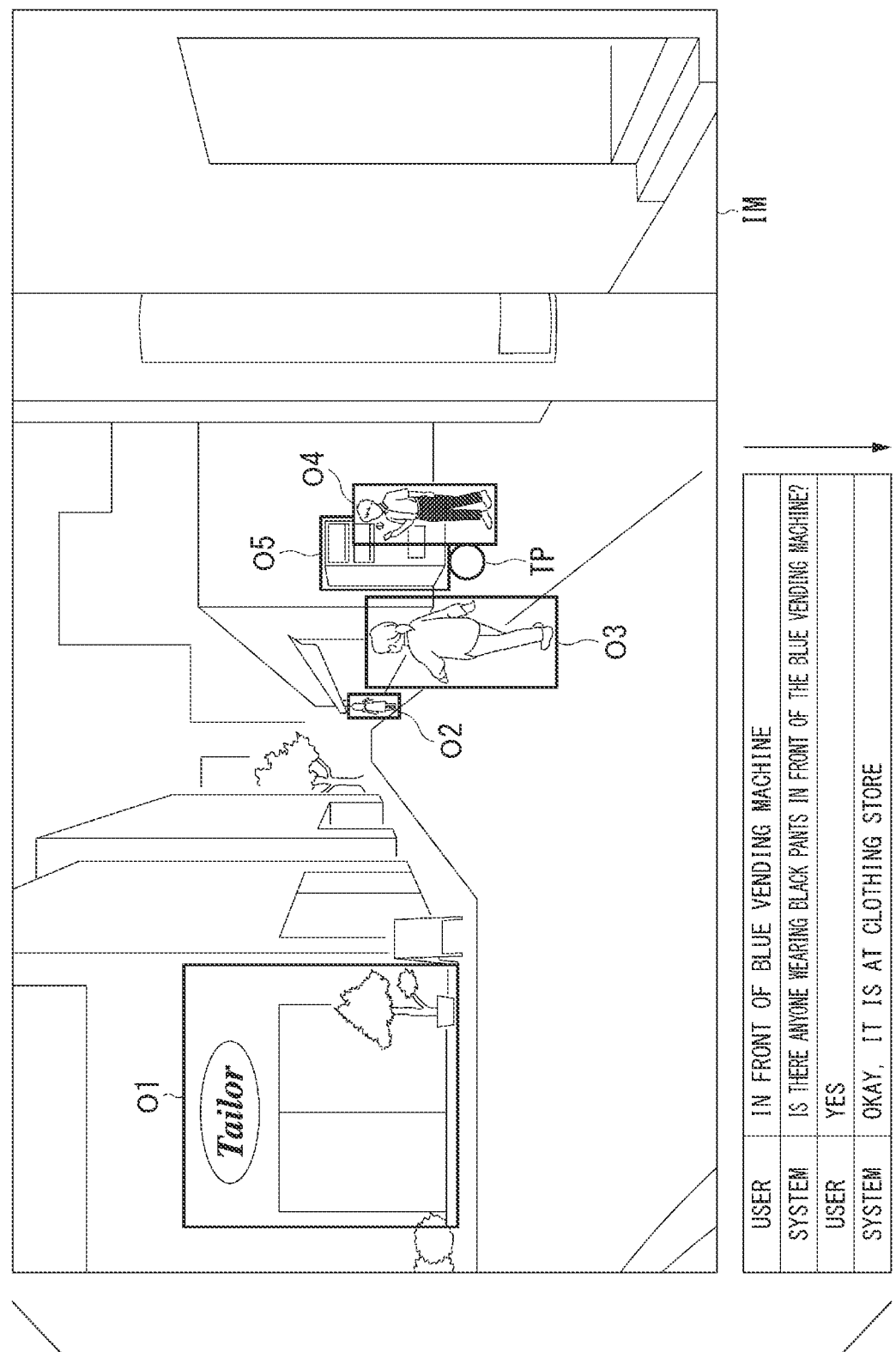
FIG. 5 is a diagram which shows an example of a dialogue with an occupant executed by a dialogue unit of the present embodiment.

FIG. 5 is a diagram which shows an example of a dialogue with the occupant executed by the dialogue unit 130 of the present embodiment. FIG. 5 represents the same situation as FIG. 3. As described above, the dialogue unit 130 calculates the score value S considering the degree of certainty c, the degree of area narrowing-down n, uniqueness u, and static nature s of each detected object, selects an object having a higher calculated score value S, and uses it for an inquiry to the occupant. As a result, it is possible to reduce the number of utterance turns of a dialogue required to finally specify an object indicated by a user, and to improve convenience of the user of the mobile object.

In the description above, it is described that the dialogue unit 130 calculates the score value S considering all of the degree of certainty c, the degree of area narrowing-down n, the uniqueness u, and the static nature s, but the present invention is not limited to such a configuration, and the score value S may be calculated as long as at least the degree of certainty c is considered.

Figure 6:
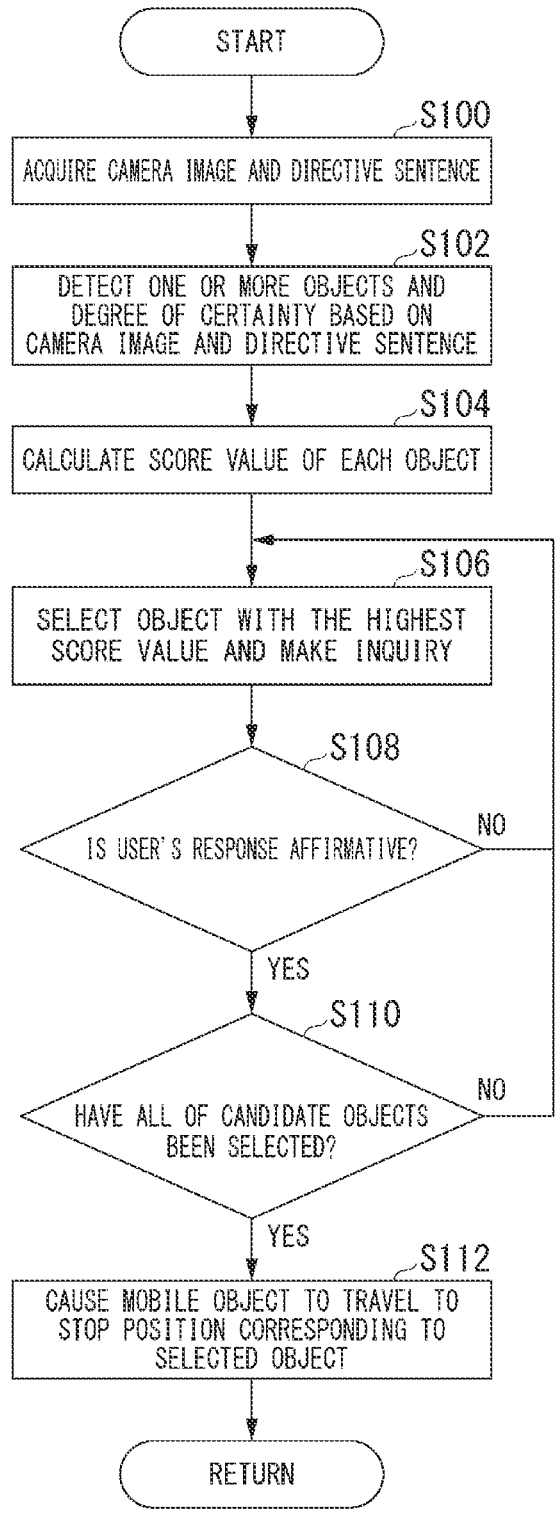
FIG. 6 is a flowchart which shows an example of a flow of processing executed by a control device.

Next, an example of a flow of processing executed by the control device 100 will be described with reference to FIG. 6. FIG. 6 is a flowchart which shows an example of the flow of processing executed by the control device 100. The processing of the flowchart shown in FIG. 6 is executed, for example, when the occupant inputs a directive sentence indicating the stop position of the mobile object 1 via the HMI 20.

First, the acquisition unit 110 acquires a captured image obtained by capturing an image of the surroundings of the mobile object 1 with the external camera, which is the external detection device 10, and a directive sentence input by the occupant (step S100). Next, the detection unit 120 detects one or more objects and the degree of certainty by inputting the acquired captured image and the directive sentence to the learned model 73 (step S102). Next, the dialogue unit 130 calculates the score value of each detected object (step S104).

Next, the dialogue unit 130 selects an object with the highest score value and makes an inquiry to the occupant to confirm whether the object is close to an intended target position (step S106). Next, the dialogue unit 130 acquires a response of a user and determines whether the response is affirmative (step S108). When it is determined that the response of a user is not affirmative, the dialogue unit 130 returns the processing to step S106 and selects an object with the highest score value from the remaining unselected objects. On the other hand, when it is determined that the response of the user is affirmative, the dialogue unit 130 determines whether all of the detected one or more candidate objects have been selected (step S110). When it is determined that all of the detected one or more candidate objects have not been selected, the processing returns to step S106, and an object with the highest score value is selected from the remaining unselected objects.

On the other hand, when it is determined that all of the detected one or more candidate objects have been selected, the control unit 140 specifies a stop position corresponding to the selected object, and causes the mobile object 1 to travel to the specified stop position (step S112). As a result, the processing of this flowchart will end.

According to the present embodiment described above, it is possible to reduce the number of utterance turns of a dialogue required to finally specify an object indicated by a user of a mobile object and to improve convenience for the user by inputting the captured image captured by the camera and the input directive sentence input by the occupant to the learned model that is learned to output an object together with its degree of certainty to detect one or more objects and the degree of certainty, sequentially selecting one or more objects on the basis of at least the degree of certainty, making an inquiry to the user of the mobile object, and causing the mobile object to travel to a stop position specified on the basis of a result of the inquiry.

The embodiment described above can be expressed as follows.

A mobile object control device is configured to include a storage medium that stores computer-readable instructions, and a processor connected to the storage medium, and the processor executes the computer-readable instructions, thereby acquiring a captured image obtained by capturing an image of surroundings of the mobile object by a camera mounted on a mobile object and an input directive sentence input by a user of the mobile object, inputting, when an image and a directive sentence are input, the captured image and the input directive sentence into a learned model learned to output one or more objects corresponding to the directive sentence in the image together with corresponding degrees of certainty to detect the one or more objects and the corresponding degrees of certainty, sequentially selecting the one or more objects on the basis of at least the degree of certainty and making an inquiry to a user of the mobile object, and causing the mobile object to travel to an indicated position in the input directive sentence, which is specified on the basis of a result of the inquiry.

As described above, a mode for implementing the present invention has been described using the embodiments, but the present invention is not limited to such embodiments at all, and various modifications and replacements can be added within a range not departing from the gist of the present invention.

What is claimed is:

1. A mobile object control device of a mobile object, comprising:
    a storage medium configured to store an instruction readable by a computer, and
    a processor connected to the storage medium,
    wherein the processor executes the instruction readable by the computer, thereby
    acquiring a captured image obtained by capturing an image of surroundings of the mobile object via a camera mounted on the mobile object and an input directive sentence input by a user of the mobile object,
    inputting the captured image and the input directive sentence into a machine learning model trained to output one or more objects corresponding to the directive sentence in the image together with corresponding degrees of certainty to detect the one or more objects and the corresponding degrees of certainty,
    sequentially selecting the one or more objects on the basis of at least the degree of certainty and making an inquiry to the user of the mobile object, and causing the mobile object to travel to an indicated position in the input directive sentence, which is specified on the basis of a result of the inquiry, wherein the processor selects, among the acquired one or more objects, objects in descending order of score values considering at least the degree of certainty, and makes an inquiry to the user of the mobile object, and wherein the processor selects objects in descending order of score values further considering a horizontal position of the acquired one or more objects in the captured image, and makes an inquiry to the user of the mobile object.

2. The mobile object control device of the mobile object according to claim 1, wherein the processor classifies the acquired one or more objects into one or more classes, selects objects in descending order of score values further considering a classification ratio of the one or more classes, and makes an inquiry to the user of the mobile object.

3. The mobile object control device of the mobile object according to claim 1, wherein the processor selects objects in descending order of score values further considering a moving tendency of the acquired one or more objects, and makes an inquiry to the user of the mobile object.

4. A mobile object control method for controlling a mobile object, comprising:

by a computer, acquiring a captured image obtained by capturing an image of surroundings of the mobile object via a camera mounted on the mobile object and an input directive sentence input by a user of the mobile object;

inputting the captured image and the input directive sentence into a machine learning model trained to output one or more objects corresponding to the directive sentence in the image together with corresponding degrees of certainty to detect the one or more objects and the corresponding degrees of certainty;

sequentially selecting the one or more objects on the basis of at least the degree of certainty and making an inquiry to the user of the mobile object;

causing the mobile object to travel to an indicated position in the input directive sentence, which is specified on the basis of a result of the inquiry, selecting, among the acquired one or more objects, objects in descending order of score values considering at least the degree of certainty, and making an inquiry to the user of the mobile object, and selecting objects in descending order of score values further considering a horizontal position of the acquired one or more objects in the captured image, and making an inquiry to the user of the mobile object.

5. A computer-readable non-transitory storage medium that stores a program causing a computer to execute:

acquiring a captured image obtained by capturing an image of surroundings of a mobile object via a camera mounted on the mobile object and an input directive sentence input by a user of the mobile object, inputting the captured image and the input directive sentence into a machine learning model trained to output one or more objects corresponding to the directive sentence in the image together with corresponding degrees of certainty to detect the one or more objects and the corresponding degrees of certainty, sequentially selecting the one or more objects on the basis of at least the degree of certainty and making an inquiry to the user of the mobile object, causing the mobile object to travel to an indicated position in the input directive sentence, which is specified on the basis of a result of the inquiry, selecting, among the acquired one or more objects, objects in descending order of score values considering at least the degree of certainty, and making an inquiry to the user of the mobile object, and selecting objects in descending order of score values further considering a horizontal position of the acquired one or more objects in the captured image, and making an inquiry to the user of the mobile object.

6. A mobile object control device of a mobile object, comprising:

a storage medium configured to store an instruction readable by a computer, and a processor connected to the storage medium, wherein the processor executes the instruction readable by the computer, thereby acquiring a captured image obtained by capturing an image of surroundings of the mobile object via a camera mounted on the mobile object and an input directive sentence input by a user of the mobile object, inputting the captured image and the input directive sentence into a machine learning model trained to output one or more objects corresponding to the directive sentence in the image together with corresponding degrees of certainty to detect the one or more objects and the corresponding degrees of certainty, sequentially selecting the one or more objects on the basis of at least the degree of certainty and making an inquiry to the user of the mobile object, and causing the mobile object to travel to an indicated position in the input directive sentence, which is specified on the basis of a result of the inquiry, wherein the processor selects, among the acquired one or more objects, objects in descending order of score values considering at least the degree of certainty, and makes an inquiry to the user of the mobile object, and wherein the processor classifies the acquired one or more objects into one or more classes, selects objects in descending order of score values further considering a classification ratio of the one or more classes, and makes an inquiry to the user of the mobile object.

7. A mobile object control method for controlling a mobile object, comprising:

by a computer, acquiring a captured image obtained by capturing an image of surroundings of the mobile object via a camera mounted on the mobile object and an input directive sentence input by a user of the mobile object;

inputting the captured image and the input directive sentence into a machine learning model trained to output one or more objects corresponding to the directive sentence in the image together with corresponding degrees of certainty to detect the one or more objects and the corresponding degrees of certainty;

sequentially selecting the one or more objects on the basis of at least the degree of certainty and making an inquiry to the user of the mobile object;

causing the mobile object to travel to an indicated position in the input directive sentence, which is specified on the basis of a result of the inquiry;

selecting, among the acquired one or more objects, objects in descending order of score values considering at least the degree of certainty, and making an inquiry to the user of the mobile object; and classifying the acquired one or more objects into one or more classes, selecting objects in descending order of score values further considering a classification ratio of the one or more classes, and making an inquiry to the user of the mobile object.

8. A computer-readable non-transitory storage medium that stores a program causing a computer to execute:
acquiring a captured image obtained by capturing an image of surroundings of a mobile object via a camera mounted on the mobile object and an input directive sentence input by a user of the mobile object,
inputting the captured image and the input directive sentence into a machine learning model trained to output one or more objects corresponding to the directive sentence in the image together with corresponding degrees of certainty to detect the one or more objects and the corresponding degrees of certainty,
sequentially selecting the one or more objects on the basis of at least the degree of certainty and making an inquiry to the user of the mobile object,
causing the mobile object to travel to an indicated position in the input directive sentence, which is specified on the basis of a result of the inquiry,
selecting, among the acquired one or more objects, objects in descending order of score values considering at least the degree of certainty, and making an inquiry to the user of the mobile object, and
classifies the acquired one or more objects into one or more classes, selects objects in descending order of score values further considering a classification ratio of the one or more classes, and makes an inquiry to the user of the mobile object.

9. A mobile object control device of a mobile object, comprising:
a storage medium configured to store an instruction readable by a computer, and
a processor connected to the storage medium,
wherein the processor executes the instruction readable by the computer, thereby
acquiring a captured image obtained by capturing an image of surroundings of the mobile object via a camera mounted on the mobile object and an input directive sentence input by a user of the mobile object,
inputting the captured image and the input directive sentence into a machine learning model trained to output one or more objects corresponding to the directive sentence in the image together with corresponding degrees of certainty to detect the one or more objects and the corresponding degrees of certainty,
sequentially selecting the one or more objects on the basis of at least the degree of certainty and making an inquiry to the user of the mobile object, and
causing the mobile object to travel to an indicated position in the input directive sentence, which is specified on the basis of a result of the inquiry,
wherein the processor selects, among the acquired one or more objects, objects in descending order of score values considering at least the degree of certainty, and makes an inquiry to the user of the mobile object, and wherein the processor selects objects in descending order of score values further considering a moving tendency of the acquired one or more objects, and makes an inquiry to the user of the mobile object.

10. A mobile object control method for controlling a mobile object, comprising:
by a computer,
acquiring a captured image obtained by capturing an image of surroundings of the mobile object via a camera mounted on the mobile object and an input directive sentence input by a user of the mobile object;
inputting the captured image and the input directive sentence into a machine learning model trained to output one or more objects corresponding to the directive sentence in the image together with corresponding degrees of certainty to detect the one or more objects and the corresponding degrees of certainty;
sequentially selecting the one or more objects on the basis of at least the degree of certainty and making an inquiry to the user of the mobile object;
causing the mobile object to travel to an indicated position in the input directive sentence, which is specified on the basis of a result of the inquiry;
selecting, among the acquired one or more objects, objects in descending order of score values considering at least the degree of certainty, and making an inquiry to the user of the mobile object; and
selecting objects in descending order of score values further considering a moving tendency of the acquired one or more objects, and making an inquiry to the user of the mobile object.

11. A computer-readable non-transitory storage medium that stores a program causing a computer to execute:
acquiring a captured image obtained by capturing an image of surroundings of a mobile object via a camera mounted on the mobile object and an input directive sentence input by a user of the mobile object,
inputting the captured image and the input directive sentence into a machine learning model trained to output one or more objects corresponding to the directive sentence in the image together with corresponding degrees of certainty to detect the one or more objects and the corresponding degrees of certainty,
sequentially selecting the one or more objects on the basis of at least the degree of certainty and making an inquiry to the user of the mobile object,
causing the mobile object to travel to an indicated position in the input directive sentence, which is specified on the basis of a result of the inquiry,
selecting, among the acquired one or more objects, objects in descending order of score values considering at least the degree of certainty, and making an inquiry to the user of the mobile object, and
selecting objects in descending order of score values further considering a moving tendency of the acquired one or more objects, and making an inquiry to the user of the mobile object.

* * * * *